United States Patent
Zhang et al.

(10) Patent No.: US 10,708,790 B2
(45) Date of Patent: Jul. 7, 2020

(54) ADAPTIVE BEAMFORMING SCANNING

(71) Applicant: Telefonaktiebolaget LM Ericsson (publ), Stockholm (SE)

(72) Inventors: Zhan Zhang, Beijing (CN); Jinhua Liu, Beijing (CN); Jianfeng Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/261,627

(22) Filed: Jan. 30, 2019

(65) Prior Publication Data
US 2019/0159041 A1    May 23, 2019

Related U.S. Application Data

(63) Continuation of application No. 15/524,157, filed as application No. PCT/CN2015/091419 on Oct. 2, 2015, now Pat. No. 10,231,135.

(51) Int. Cl.
| | |
|---|---|
| *H04W 16/28* | (2009.01) |
| *H04B 7/08* | (2006.01) |
| *H04W 48/16* | (2009.01) |
| *H04B 7/06* | (2006.01) |
| *H04W 72/04* | (2009.01) |
| *H04W 74/08* | (2009.01) |
| *G06F 17/18* | (2006.01) |
| *H01Q 3/24* | (2006.01) |

(52) U.S. Cl.
CPC .......... *H04W 16/28* (2013.01); *H04B 7/0695* (2013.01); *H04B 7/086* (2013.01); *H04B 7/088* (2013.01); *H04W 48/16* (2013.01); *G06F 17/18* (2013.01); *H01Q 3/245* (2013.01); *H04W 72/046* (2013.01); *H04W 74/0833* (2013.01)

(58) Field of Classification Search
CPC .......................... H04W 16/28; H04W 72/042; H04W 72/0446
See application file for complete search history.

(56) References Cited

U.S. PATENT DOCUMENTS

| | | | |
|---|---|---|---|
| 6,522,898 B1 * | 2/2003 | Kohno | H01Q 3/2605 342/383 |
| 2004/0156443 A1 | 8/2004 | Dent | |
| 2005/0110641 A1 | 5/2005 | Mendolia et al. | |
| 2008/0194204 A1 | 8/2008 | Duet et al. | |
| 2008/0224828 A1 | 9/2008 | Ando et al. | |
| 2011/0059706 A1 | 3/2011 | Harel et al. | |

(Continued)

FOREIGN PATENT DOCUMENTS

CN    103476043 A    12/2013

*Primary Examiner* — Keith Ferguson
(74) *Attorney, Agent, or Firm* — Murphy, Bilak & Homiller, PLLC (57) ABSTRACT

There is provided mechanisms for adaptive beamforming scanning. A method is performed by a network device having a non-uniform directional network coverage. The method comprises obtaining a beam pattern indicating spatial directions in which reception of identification signals is to be scanned, wherein the beam pattern is defined by the non-uniform directional network coverage. The method comprises scanning with directional beams in the spatial directions according to the beam pattern for reception of the identification signals from wireless devices

13 Claims, 4 Drawing Sheets

(56) References Cited

U.S. PATENT DOCUMENTS

2011/0273294 A1   11/2011  Harwell
2013/0272220 A1*  10/2013  Li .................... H04W 72/046
                                                            370/329
2014/0348051 A1   11/2014  Park et al.
2016/0042206 A1    2/2016  Pesavento et al.

* cited by examiner

ADAPTIVE BEAMFORMING SCANNING

RELATED APPLICATIONS

This application is a continuation of U.S. application Ser. No. 15/524,157 filed 3 May 2017, which is a U.S. National Phase Application No. PCT/CN2015/091419 filed 2 Oct. 2015. The entire contents of each aforementioned application is incorporated herein by reference.

TECHNICAL FIELD

Embodiments presented herein relate to adaptive beamforming scanning, and particularly to a method, a network device, a computer program, and a computer program product for adaptive beamforming scanning.

BACKGROUND

In communications systems, there may be a challenge to obtain good performance and capacity for a given communications protocol, its parameters and the physical environment in which the communications system is deployed.

For example, basic requirement for any cellular communications system is the possibility for a wireless device to initially request a connection setup, commonly referred to as random access. In Long Term Evolution (LTE) communications systems, the random access procedure comes in two forms, allowing the random access to be either contention-based or contention-free. The contention-based procedure comprises four-steps; a first step of preamble transmission, a second step of random access response, a third step of protocol Layer 2/Layer 3 message transmission, and a fourth step of contention resolution message exchange.

In LTE, the preamble sequences in the first step are generated from cyclic shifts of a root Zadoff-Chu (ZC) sequence. Sequences obtained from cyclic shifts of different ZC sequences are not orthogonal. Therefore, orthogonal sequences obtained by cyclically shifting a single root sequence should be favored over non-orthogonal sequences. The preamble sequence is by the wireless device sent in a time-frequency slot towards a radio access network node in the communication system.

Once detecting the preamble in the time-frequency slot, the radio access network node would in the second step send a Random Access Response (RAR) on the so-called Physical Downlink Shared CHannel (PDSCH), and addressed by an identity (ID), Random Access Radio Network Temporary Identifier (RA-RNTI), which conveys the identity of the detected preamble, a timing alignment instruction to synchronize subsequent uplink transmission from the wireless device, an initial uplink resource grant for transmission of the message in the third step, and an assignment of a temporary Cell Radio Network Temporary Identifier (C-RNTI).

In the third step, the wireless device would convey the actual random access procedure message, such as a radio resource control (RRC) connection request, tracking area update (TAU), or scheduling request.

In the fourth step, the contention resolution message would be sent by the radio access network node.

It is foreseen that emerging wireless communications systems may benefit from the use of a large number of antenna elements at the radio access node (possibly also at the wireless device), especially in conjunction with higher carrier frequencies than used in current wireless communications systems.

Hence, there is a need for an improved reception of identification signals from a wireless device.

SUMMARY

An object of embodiments herein is to provide efficient reception of identification signals from a wireless device.

According to a first aspect there is presented a method for adaptive beamforming scanning. The method is performed by a network device having a non-uniform directional network coverage. The method comprises obtaining a beam pattern indicating spatial directions in which reception of identification signals is to be scanned, wherein the beam pattern is defined by the non-uniform directional network coverage. The method comprises scanning with directional beams in the spatial directions according to the beam pattern for reception of the identification signals from wireless devices.

Advantageously this method for adaptive beamforming scanning provides efficient beamforming scanning which enables efficient reception of identification signals from wireless devices.

Advantageously this method for adaptive beamforming scanning enables regions in the network coverage having network outage to be avoided, or at least reduced.

Advantageously this method for adaptive beamforming scanning enables bottlenecks which may occur in scenarios where identification signals are to be received by a network device, such as during random access procedures, to be resolved, or at least reduced.

Advantageously, the disclosed scanning for reception of identification signals is transparent to the wireless devices, thus avoiding additional signaling complexity between network device and wireless device, further avoiding any change in the receiving algorithm at the wireless device, and thus allowing a wide applicability.

According to a second aspect there is presented a network device for adaptive beamforming scanning. The network device is configured for a non-uniform directional network coverage. The network device comprises processing circuitry. The processing circuitry is configured to cause the network device to obtain a beam pattern indicating spatial directions in which reception of identification signals is to be scanned, wherein the beam pattern is defined by the non-uniform directional network coverage. The processing circuitry is configured to cause the network device to scan with directional beams in the spatial directions according to the beam pattern for reception of the identification signals from wireless devices.

According to an embodiment the network device of the second aspect further comprises a storage medium. The processing circuitry is configured to retrieve a set of operations from the storage medium and to execute the set of operations in order for the network device to obtain the beam pattern and scan with the directional beams.

According to a third aspect there is presented a network device for adaptive beamforming scanning. The network device is configured for a non-uniform directional network coverage. The network node comprises processing circuitry. The network node comprises a computer program product storing instructions that, when executed by the processing circuitry, causes the network device to perform a method according to the first aspect.

According to a fourth aspect there is presented a network device for adaptive beamforming scanning. The network device is configured for a non-uniform directional network coverage. The network node comprises an obtain module configured to obtain a beam pattern indicating spatial directions in which reception of identification signals is to be scanned, wherein the beam pattern is defined by the non-uniform directional network coverage. The network node comprises a scan module configured to scan with directional beams in the spatial directions according to the beam pattern for reception of the identification signals from wireless devices.

According to a fifth aspect there is presented a communications system for adaptive beamforming scanning. The system comprises circuitry defining functionality of at least one network device according to any of the second to fourth aspects.

According to a sixth aspect there is presented a computer program for adaptive beamforming scanning, the computer program comprising computer program code which, when run on a network device, causes the network device to perform a method according to the first aspect.

According to a seventh aspect there is presented a computer program product comprising a computer program according to the sixth aspect and a computer readable medium, such as a non-volatile computer readable medium, on which the computer program is stored.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
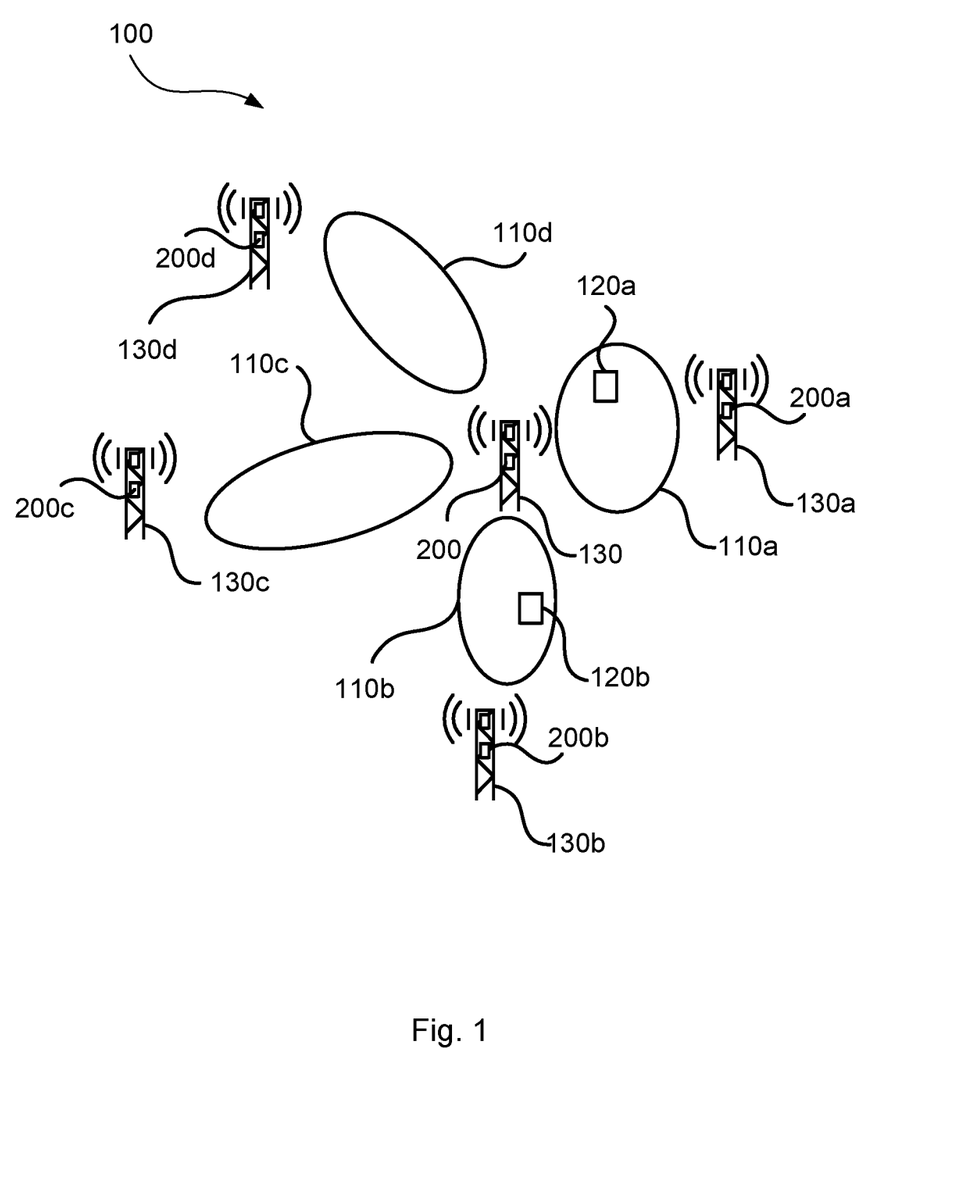
FIG. 1 is a schematic diagram illustrating a communications system according to embodiments.

FIG. 1 is a schematic diagram illustrating a communications system 100 where embodiments presented herein can be applied. The communications system 100 comprises radio access network nodes 130, 130a, 130b, 130c, 130d. Each radio access network node 130, 130a, 130b, 130c, 130d may be a radio base station, a base transceiver station, a Node B, and Evolved node B, or an Access Point. Each radio access network node 130, 130a, 130b, 130c, 130d is controlled by a respective network device 200, 200a, 200b, 200c, 200d. The functionality of the network device 200 will be further disclosed below. Further, the terms radio access network node and network device may be used interchangeably throughout this disclosure.

The radio access network nodes 130, 130a, 130b, 130c, 130d are configured for transmission and reception to and from wireless devices 120a, 120b in directional beams. Each wireless device 120a, 120b may be a portable wireless device, a mobile station, a mobile phone, a handset, a wireless local loop phone, a User Equipment (UE), a smartphone, a laptop computer, a tablet computer, a wireless modem, or a sensor.

As an example, radio access network node 130 is configured for such transmission and reception in directional beams 110a, 110b, 110c, 110d. Thereby, a wireless device 120a, 120b located in a region defined by a directional beams 110a, 110b, 110c, 110d is able to access data and services provided by the communications system 100. In the illustrative example of FIG. 1, wireless device 120a is located in a region served by directional beam 110a of the radio access network node 130 and wireless device 120b is located in a region served by directional beam 110b of the radio access network node 130.

In order for a wireless device 120a, 120b to access data and services provided by the communications system 100 the wireless device 120a, 120b establish an operative connection to at least one of the radio access network nodes 130, 130a, 130b, 130c, 130d. The process of establishing such an operative connection involves the wireless device 120a, 120b to perform a random access procedure.

One example of a preamble sequence is constructed by repeating the short preamble sequence multiple times. In this way, the amount of special random-access related processing and hardware support is significantly reduced for multi-antenna systems, and the detector is also robust against inter-carrier interference from other uplink channels and signals. Furthermore, the proposed preamble detector scheme can be used in scenarios with a high amount of phase noise and frequency errors.

A radio access network node may commonly spatially scan its serving coverage by hybrid beamforming switching (a combination of digital and analogue beamforming) during the random access time window. In other words, a specific receiving beam usually stays at a certain slot, e.g., 1/N of the total preamble detection window length for a total of N directional beams, before switching to another directional beam.

The shorter signal accumulation duration reduces the total received signal power, and also the signal to noise and interference ratio of the random access signal, and thus ultimately reduces the random access signal detection success rate and coverage region where the random access signal can be received by the radio access network node. Thus, a receiving signal power gain obtained by massive antenna hybrid beamforming is reduced because of the short stay duration in each directional beam as compared to a scenario where beam forming is not used.

A wireless device 120a, 120b may during its random access procedure thus repeatedly transmitting identification signals, such as a Physical Random Access CHannel (PRACH) sequence, and the network device monitors for reception of the PRACH sequence in different directions by performing scanning in directional beams. The coverage requirements could be different in different directions of the network device 200 owing to at least two reasons. Firstly, some neighboring network device 200a, 200b, 200c, 200d may provide network access in a region covered by a directional beam of the network device 200. Secondly, there might be compared to other directions, very few or even no requests at all from wireless devices 120a, 120b in a particular direction due to environmental factors, thus causing a comparatively very small presence of wireless devices 120a, 120b in that particular direction. On the contrary, in some other particular directions a good network coverage is necessary due to neighboring network devices being far away in these other particular directions. Therefore, a scanning procedure for reception of identification signals from wireless devices based on equal time duration in each directional beam and with all directional beams having equal widths cannot match communications systems 100 with non-uniform network coverage.

The embodiments disclosed herein therefore relate to adaptive beamforming scanning. In order to obtain adaptive beamforming scanning there is provided a network device 200, a method performed by the network device 200, a computer program comprising code, for example in the form of a computer program product, that when run on a network device 200, causes the network device 200 to perform the method.

Figure 2A:
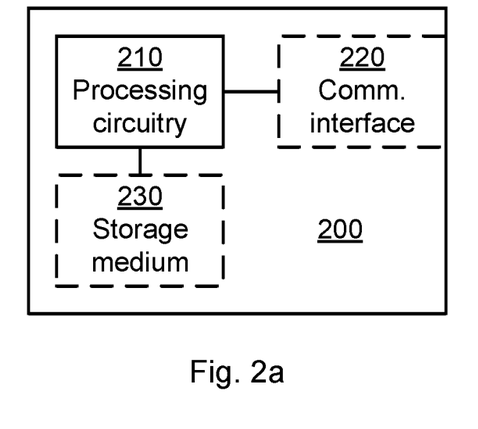
FIG. 2a is a schematic diagram showing functional units of a network device according to an embodiment.

FIG. 2a schematically illustrates, in terms of a number of functional units, the components of a network device 200 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310 (as in FIG. 3), e.g. in the form of a storage medium 230.

Particularly, the processing circuitry 210 is configured to cause the network device 200 to perform a set of operations, or steps, S102-S208. These operations, or steps, S102-S208 depicted in FIGS. 4, 5 and 6 will be disclosed below. For example, the storage medium 230 may store the set of operations, and the processing circuitry 210 may be configured to retrieve the set of operations from the storage medium 230 to cause the network device 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network device 200 may further comprise a communications interface 220 for communications with at least one wireless device 120a, 120b and possible at least one other network device 200a, 200b, 200c, 200d. As such the communications interface 220 may comprise one or more transmitters and receivers, comprising analogue and digital components. The processing circuitry 210 controls the general operation of the network device 200 e.g. by sending data and control signals to the communications interface 220 and the storage medium 230, by receiving data and reports from the communications interface 220, and by retrieving data and instructions from the storage medium 230. Other components, as well as the related functionality, of the network device 200 are omitted in order not to obscure the concepts presented herein.

Figure 2B:
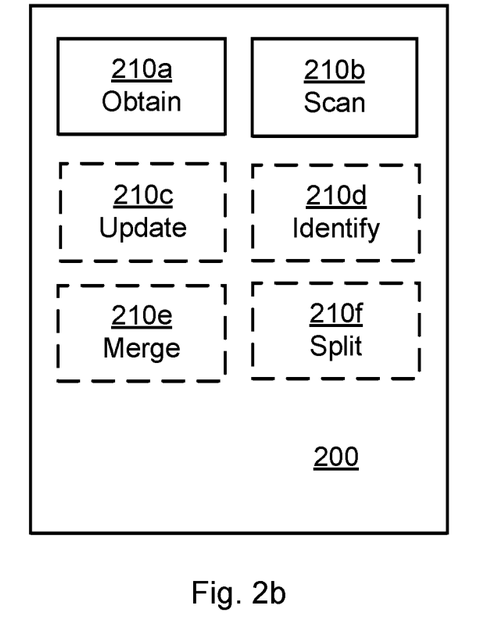
FIG. 2b is a schematic diagram showing functional modules of a network device according to an embodiment.

FIG. 2b schematically illustrates, in terms of a number of functional modules, the components of a network device 200 according to an embodiment. The network device 200 of FIG. 2b comprises a number of functional modules; an obtain module 210a configured to perform below steps S102, S104, and a scan module 210b configured to perform below step S112. The network device 200 of FIG. 2b may further comprises a number of optional functional modules, such as any of an update module 210c configured to perform below steps S106, S108, S108b, S110, and identify module 210d configured to perform below step S108a, a merge module 210e configured to perform below step S108c, and a split module 210f configured to perform below step S108d. The functionality of each functional module 210a-210f will be further disclosed below in the context of which the functional modules 210a-210f may be used. In general terms, each functional module 210a-210f may in one embodiment be implemented only in hardware or and in another embodiment with the help of software, i.e., the latter embodiment having computer program instructions stored on the storage medium 230 which when run on the processing circuitry makes the network device 200 perform the corresponding steps mentioned above in conjunction with FIG. 2b. For a hardware implementation the functional modules 210a-210f may be implemented in the processing circuitry 210, possibly also in the communications interface 220 and the storage medium 230. It should also be mentioned that even though the modules correspond to parts of a computer program, they do not need to be separate modules therein, but the way in which they are implemented in software is dependent on the programming language used. Preferably, one or more or all functional 210a-210f may be implemented by the processing circuitry 210, possibly in cooperation with functional units 220 and/or 230. The processing circuitry 210 may thus be configured to from the storage medium 230 fetch instructions as provided by a functional module 210a-210f and to execute these instructions, thereby performing any steps as will be disclosed hereinafter.

Hence, in comparison to FIG. 2a, FIG. 2b provides a functional oriented description of the network node 200 whereas FIG. 2a provides a building block oriented view of the network node 200. The building blocks (i.e., the processing circuitry 200, the communications interface 220, and the storage medium 230) of the network node 200 in FIG. 2a may be configured to perform the functionality defined by the functional modules 210a-210f of the network node 200 in FIG. 2b.

The network device 200 may be provided as a standalone device or as a part of at least one further device. For example, the network device 200 may be provided in a node of a radio access network or in a node of a core network. Alternatively, functionality of the network device 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the wireless devices 120a, 120b than instructions that are not required to be performed in real time.

Thus, a first portion of the instructions performed by the network device 200 may be executed in a first device, and a second portion of the of the instructions performed by the network device 200 may be executed in a second device; the herein disclosed embodiments are not limited to any particular number of devices on which the instructions performed by the network device 200 may be executed. Hence, the methods according to the herein disclosed embodiments are suitable to be performed by a network device 200 residing in a cloud computational environment. Therefore, although a single processing circuitry 210 is illustrated in FIG. 2a the processing circuitry 210 may be distributed among a plurality of devices, or nodes. The same applies to the functional modules 210a-210f of FIG. 2b and the computer program 320 of FIG. 3 (see below).

Figure 3:
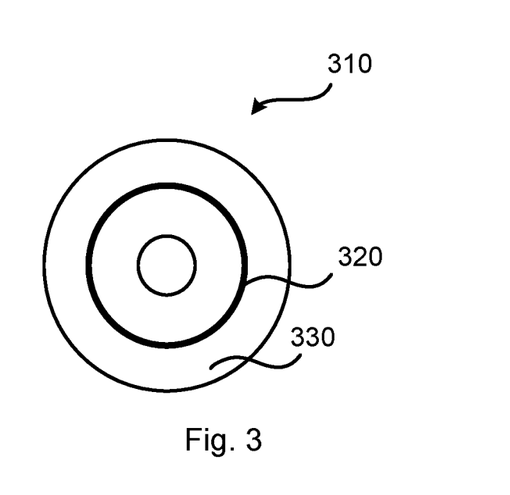
FIG. 3 shows one example of a computer program product comprising computer readable means according to an embodiment.

FIG. 3 shows one example of a computer program product 310 comprising computer readable means 330. On this computer readable means 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
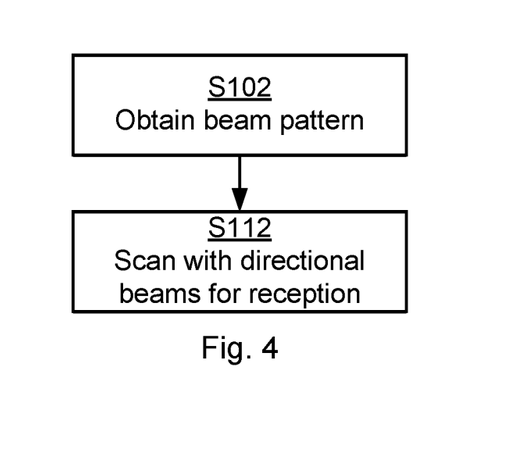
FIGS. 4, 5, and 6 are flowcharts of methods according to embodiments.
Figure 5:
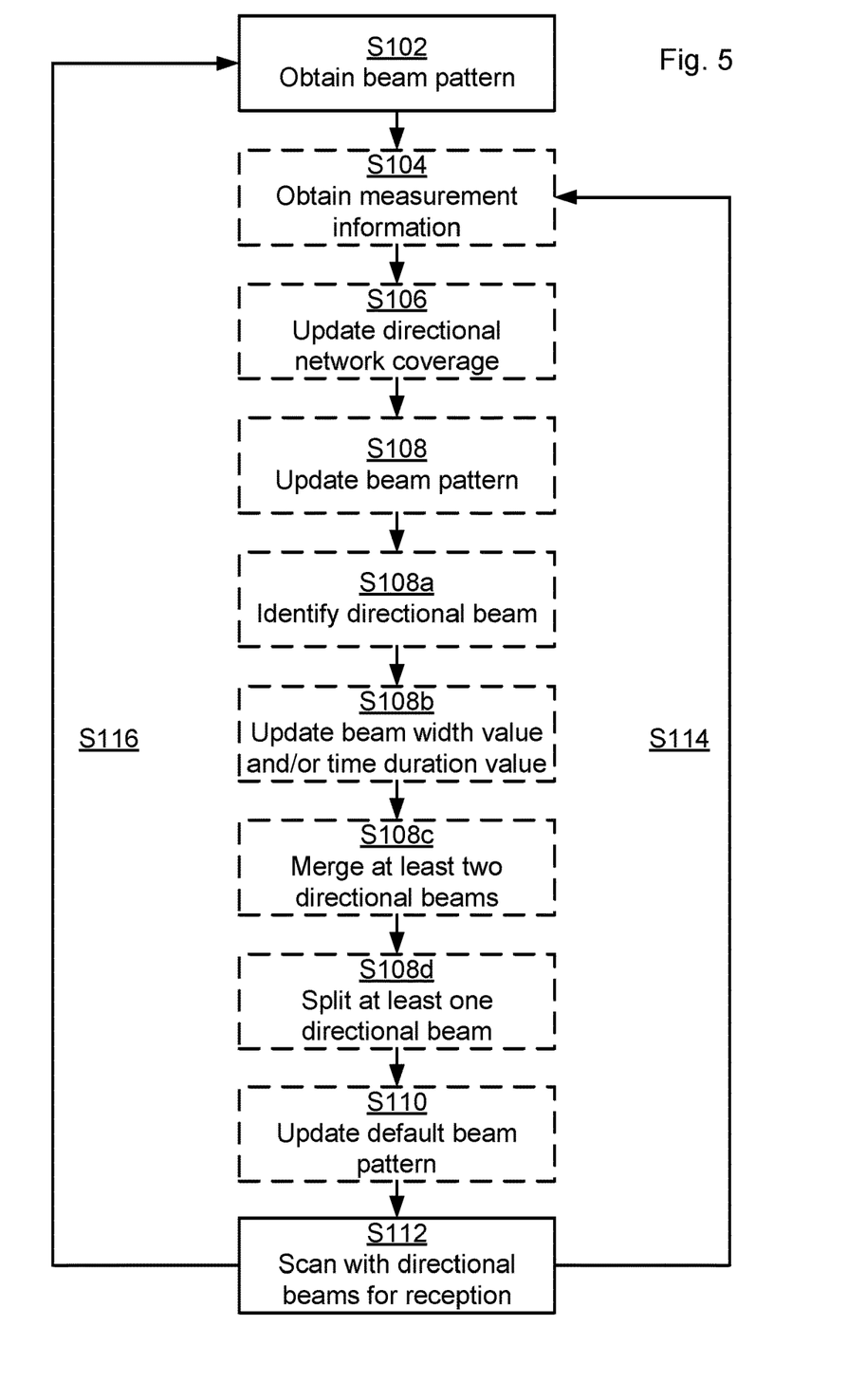

FIGS. 4 and 5 are flow chart illustrating embodiments of methods for adaptive beamforming scanning. The methods are performed by the network device 200. The methods are advantageously provided as computer programs 320.

Reference is now made to FIG. 4 illustrating a method for adaptive beamforming scanning as performed by the network device 200 according to an embodiment.

The network device 200 has a non-uniform directional network coverage. In general terms, network coverage of a network device 200 may be defined as the region in which the network device 200 can provide network access to a wireless device 120a, 120b. Network access inter alia involves the network device to receive identification signals from the wireless device 120a, 120b.

As noted above, the wireless devices 120a, 120b perform a random access procedure in order to obtain network access. This random access procedure involves the wireless devices 120a, 120b to transmit identification signals. The network device 200 therefore performs scanning for reception of the identification signals. The scanning is performed according to a beam pattern.

The network device 200 is therefore configured to, in a step S102, obtain a beam pattern. In this respect the obtain module 210a may comprise instructions that when executed by the network device 200 causes the processing circuitry 210, possibly in conjunction with the communications interface 220 and the storage medium 230, to obtain the beam pattern in order for the network device 200 to perform step S102. Examples of how the beam pattern may be obtained will be disclosed below. The beam pattern indicates spatial directions in which reception of identification signals is to be scanned. The beam pattern is defined by the non-uniform directional network coverage of the network device 200. Examples of how the beam pattern may be defined by the non-uniform directional network coverage will be disclosed below.

Once the beam pattern has been obtained the network device 200 can use the beam pattern for the scanning for reception of the identification signals. The network device 200 is configured to, in a step S112, scan with directional beams 110a, 110b, 110c, 110d in the spatial directions according to the beam pattern for reception of the identification signals from wireless devices 120a, 120b. In this respect the scan module 210b may comprise instructions that when executed by the network device 200 causes the processing circuitry 210, possibly in conjunction with the communications interface 220 and the storage medium 230, to scan with directional beams 110a, 110b, 110c, 110d in order for the network device 200 to perform step S112.

This method for adaptive beamforming scanning enables a conditional (i.e., conditional on the non-uniform network coverage) unequal-time duration beam scanning procedure for reception of identification signals to match coverage demand in different directions of the network device 200. Thereby, instead of equal time-spatial beam scanning for reception of identification signals, this method for adaptive beamforming scanning enables the coverage of the directional beams to match the non-uniform directional network coverage in the different scanning directions.

The herein disclosed beam scanning procedure could thereby boost the received signal quality adaptively so as to mitigate any bottleneck caused by random access attempts made in certain regions of the network coverage of the network device 200.

Embodiments relating to further details of adaptive beamforming scanning will now be disclosed.

There may be different occasions when the network device 200 is to perform the scanning for reception of the identification signals as in step S112. For example, the identification signals may be part of a random access procedure. Hence, the scanning for reception of the identification signals may be part of a random access procedure.

Further, there may be different types of identification signals to scan for. For example, each identification signal may comprise a physical random access channel (PRACH) preamble. That is, the identification signals may be random access preamble signals, constructed by a number of repeated short preambles.

There may be different ways define the non-uniform spatial network coverage. For example, the non-uniform spatial network coverage may identify at least two network coverage regions having mutually different network coverage levels. Hence, the non-uniform spatial network coverage may comprise at least on region having a lower network coverage than another region in the non-uniform spatial network coverage. As the skilled person would understand, the herein disclosed embodiments are not limited to any particular number of coverage levels in the non-uniform spatial network coverage.

All directional beams 110a, 110b, 110c, 110d have a certain beam width. There may be different ways to determine the values of these beam widths. The directional beams 110a, 110b, 110c, 110d may have beam width values taken from a non-uniform set determined according to the beam pattern. Hence, the directional beams 110a, 110b, 110c, 110d may have non-uniform beam widths, or lobes. However, in order to minimize the risk of network coverage holes, the directional beams 110a, 110b, 110c, 110d may be required to be wider or equal than a certain minimum beam width. Hence, none of the beam width values may be smaller than a pre-configured first threshold value.

The scanning remains in each directional beam 110a, 110b, 110c, 110d a certain amount of time. For example, the directional beams 110a, 110b, 110c, 110d may take time duration values for the scanning from a non-uniform set of time duration values, where the non-uniform set of time duration values is determined according to the beam pattern. However, in order to minimize the risk of network coverage holes, the scanning may be required to stay in each directional beam 110a, 110b, 110c, 110d equal or longer than a certain minimum stay time. Hence, none of the time duration values may be smaller than a pre-configured second threshold value. In this respect, the network node 200 can further be configured to receive identification signals in at least two frequency regions in each directional beam 110a, 110b, 110c, 110d. In other words, the network node 200 may scan for reception of identification signals in at least two different frequency spectra using a single directional beam in a single direction.

Mechanisms to determine the time duration values may be based on linear equations with parameters defining the time duration proportions between the directional beam 110a, 110b, 110c, 110d with a summation to be 1.

Different examples for determining the coefficients representing the time duration values will be disclosed next.

According to a first example, a constraint relation is defined as follows. Set $1=\Sigma_{k=0}^{n} x^{[k]} a^{[k]}$, for a total of n directional beams and $x^{[k]}$ being the stay duration proportion for directional beam k, and $a^{[k]}$ being the corresponding coefficient.

According to a second example, set $a^{[k]}$: $a^{[k+1]}=Q_{edge,k}$: $Q_{edge,k+1}$, where $Q_{edge,k}$ is the edge quality (e.g. measured as signal strength, signal power, signal to interference and noise ratio (SINR), signal to noise ratio SNR, etc.) of directional beam k.

According to a third example, a non-linear relation, such as $1=\Sigma_{k=0}^{n} f(x^{[k]}) a^{[k]}$ is used, where f (y) is a non-linear function with input argument y.

Furthermore, the total scanning duration can also be re-configured explicitly via a parameter or implicitly via the default scanning pattern. That is, according to an embodiment the total time duration for scanning through all directional beams 110a, 110b, 110c, 110d is time-varying and determined according to the beam pattern. The total duration of the scanning can thereby be adapted according to the coverage requirement of the network device 200.

According to an embodiment the beam pattern is defined such that a directional beam pointing in a direction of a first network coverage is to have a wider width and/or lower time duration than a directional beam pointing in a direction of a second network coverage being lower than the first network coverage.

Thereby, instead of spending equal time duration in each directional beam for scanning in different directions, the time duration for any directional beam covering regions with poor network coverage can be increased whilst the time duration for any directional beam covering regions with good network coverage can be reduced. This allows the scanning to spend more time in the directional beam covering regions with poor network coverage than in the directional beam covering regions with good network coverage, thereby allowing a larger portion of the total time for the scanning to be spent where needed the most (i.e., in the directional beam covering regions with poor network coverage).

Further thereby, instead of equal widths of all directional beams, the width of any directional beam covering regions with poor network coverage can be narrowed to increase the beamforming gain and such that regions with poor network coverage can be scanned by multiple narrow directional beams whilst the width of any directional beam covering regions with good network coverage can be widened so as to monitor a wider region.

Reference is now made to FIG. 5 illustrating methods for adaptive beamforming scanning as performed by the network device 200 according to further embodiments.

Figure 6:
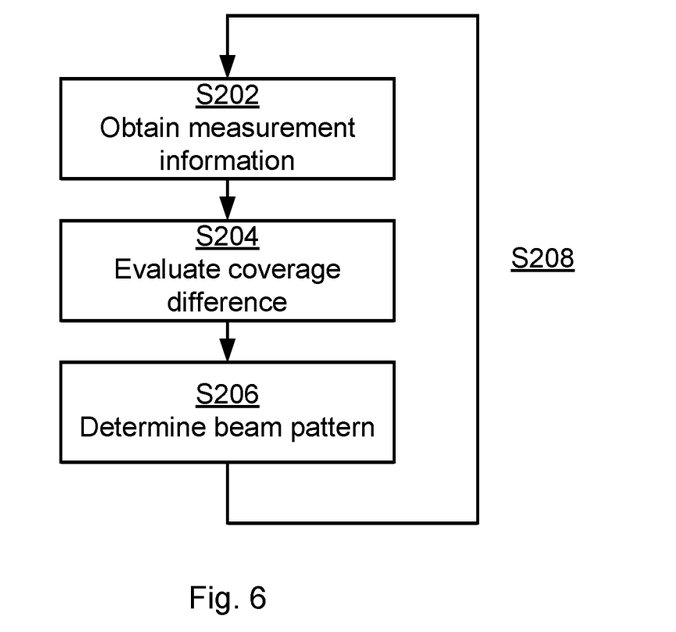

There may be different ways for the network device 200 to determine and update the beam pattern. Parallel reference is initially also made to the flow chart of FIG. 6 illustrating an embodiment for updating the beam pattern.

The network device 200, in a step S202, obtains enough measurements to determine the coverage difference between each directional beam. One way to implement step S202 is to perform step S104. The network device 200, in a step S204, evaluates the coverage differences (e.g. proportional to the coverage requirement) between different directions (i.e. corresponding to different directional beams. One way to implement step S204 is to perform step S106. The network device 200, in a step S206, determines the beam pattern based on the coverage differences in accordance with other embodiments as disclosed herein. One way to implement step S206 is to perform step S108. Once the beam pattern has been determined as in step S206, new measurement information may be obtained in a new occurrence of step S202, as indicated by the feedback step S208. An updated coverage difference may then be determined based on the thus new measurement information and an updated beam pattern may be determined based on the thus updated coverage difference.

Each of the steps S202, S204, and S206 will now be disclosed in more detail. In general terms, as noted above, steps S202, S204, and S206 may be implemented by the network device 200 performing steps S104, S106, and S108, respectively.

Details of step S202 will now be disclosed. Particularly, according to an embodiment the network device 200 is configured to, in a step S104, obtain measurement information from the wireless devices 120a, 120b. There are different kinds of measurement information the network device 200 may obtain from the wireless devices 120a, 120b. For example, the measurement information may be indicative of handover measurements, measurement on camped on directional beams 110a, 110b,110c, 110d, pilot signal quantities, number of failed random access attempts made by the wireless devices 120a, 120b, or any combination thereof. Measurement reports of handover events may thereby be obtained by the network device 200. Specifically, when a wireless device 120a, 120b is handed over to another network device, the serving network device prior to handover may record the directional beam on which the wireless device 120a, 120b is camping on before handover and the corresponding last pilot signal quality report from the wireless device. The new serving network device after handover can immediately configure the handed over wireless device 120a, 120b to report the new camped on directional beam and the corresponding pilot signal qualities of the new serving network device. After initial random access, the network device can configure the wireless device 120a, 120b to report the camped on directional beam and the corresponding pilot signal quality of the serving network device and, optionally, also to report any directional beams and the corresponding pilot signal qualities of neighboring network devices.

Details of step S204 will now be disclosed. After having obtained the measurement information the network device 200 may identify coverage differences between different regions of its non-uniform directional network coverage. The network device 200 may thus be configured to, in a step S106, update the non-uniform directional network coverage according to the measurement information. In more detail, the network device may be configured to determine the pilot signal qualities at the beam coverage edge. For instance, the beam coverage edge of a particular directional beam can be determined according to the worst quality reported by a wireless device 120a, 120b when the wireless device 120a, 12b newly accesses or leaves this particular directional beam. The network device 200 may thereby be configured to rank the directional beams according to the edge quality.

Details of step S206 will now be disclosed. The network device 200 may be configured to, in a step S108, update the beam pattern according to the updated non-uniform directional network coverage and based thereon update the beam pattern. Particular embodiments disclosing how the network device 200 may update the beam pattern will be disclosed below in relation to steps S108a, S108b, S108c, and S108d. These embodiments involve the beam pattern to be adjusted in time and/or space according to the measurement information obtained in step S104.

An embodiment for updating the beam pattern involves the network device 200 to be configured to, in a step S108a, identify which directional beam 110a, 110b, 110c, 110d of the directional beams 110a, 110b, 110c, 110d that corresponds to which measurement information. According to this embodiment the network device 200 is further configured to, in a step S108b, update at least one of a beam width value and a time duration value of the directional beams 110a, 110b, 110c, 110d according to the measurement information of the respective directional beam 110a, 110b, 110c, 110d.

As will be further disclosed below, updating the beam pattern may comprise merging at least two neighbouring directional beams in the set of directional beams into one directional beam and/or splitting at least one directional beam 110a, 110b, 110c, 110d in the set of directional beams 110a, 110b, 110c, 110d into at least two directional beams. In order to do so, the network device 200 may be configured to, based on a set of directional beams from a default beam pattern, estimate if the beam pattern results in over-dimensioned or under-dimensioned directional beam coverage and, as a result thereof, determine adjusted directional beams so as to define an updated beam pattern accordingly. Properties of the default beam pattern will be disclosed below.

According to an embodiment, where the network device 200 is configured with a default set of directional beams, the network device 200 is configured to, in a step S108c, merge at least two neighbouring directional beams in the set of directional beams into one directional beam. Merging neighbouring directional beams in the directions of good network coverage enables the scanning time to be increased in directions with poor network coverage.

An example of a beam merging procedure will now be disclosed.

For a set of directional beams to be merged, the directional beam with the worst edge quality within the set of directional beams is determined. The worst edge quality (denoted $Q_{edge,min}$) of this directional beam is then determined and compared to a predetermined minimum acceptable edge quality (denoted $Q_{thres}$) to obtain a beam dimension mismatch factor (denoted $\Delta$) as follows:

$$\Delta = Q_{edge,min} - Q_{thres} \text{ (dB)}$$

The beam dimension mismatch factor is then converted from decibel scale to linear scale using a function db2lin as follows:

$$m = db2lin(\Delta)$$

Here, m represents the directional beam width adjustment. If $m \geq 2$ it is possible for the directional beam with the worst edge quality to be merged with an adjacent directional beam. Hence, the network device 200 may be configured to use one widened directional beam instead of two individual (narrow) directional beams for reception of identification signals at such beam directions. The stay duration in this spatially widened (merged) directional beam could either remain as one scanning slot or be adjusted in accordance with embodiments disclosed herein where the directional beams 110a, 110b, 110c, 110d take time duration values for the scanning from a non-uniform set of time duration values.

According to an embodiment, where the network device 200 is configured with a default set of directional beams, the network device 200 is configured to, in a step S108d, split at least one directional beam 110a, 110b, 110c, 110d in the set of directional beams 110a, 110b, 110c, 110d into at least two directional beams.

An example of a beam splitting procedure will now be disclosed.

For directional beam k, the dimension mismatch (denoted $\Delta_k$) is defined as $$\Delta k = Q_{edge,k} - Q_{thres} \text{ (dB)}$$

where $Q_{thres}$ is the minimum acceptable edge quality and where $Q_{edge,k}$ is the edge quality for directional beam k.

The beam lobe width adjustment factor is then determined according to a beam dimension mismatch $m_k$ for directional beam k according to function db2lin as follows:

$$m_k = db2lin(\Delta_k)$$

If $m_k < 1$, directional beam k is under-dimensioned and its beam lobe width is to be decreased (and the number of directional beams may be increased due to directional beam k covers a narrower region). The network device 200 may be configured to use a subset of antenna elements of the whole antenna array (possibly a "Port") to generate an updated directional beam to replace a previously used directional beam generated by the whole antenna array. The stay duration in each directional beam could either remain as one scanning slot or be adjusted in accordance with embodiments disclosed herein where the directional beams 110a, 110b, 110c, 110d take time duration values for the scanning from a non-uniform set of time duration values.

The beam pattern originally used by the network device 200 may be a default beam pattern. The default beam pattern may be hard-coded in the network device 200, or obtained from another network device 200a, 200b, 200c, 200d. In any initial beam scanning stage, or upon deployment or installation of the network device 200, the default scanning pattern may be used. The default beam pattern may define equal time duration in each directional beam 110a, 110b, 110c, 110d, and/or equal beam width of each directional beam 110a, 110b, 110c, 110d. That is, the default beam pattern may be defined such that all directional beams have the same beam width and the stay time in each directional beam is equal. Alternatively, the default beam pattern may be defined such that the beam widths and the stay times are set according to a default non-uniform directional network coverage of the network device 200. The network device 200 may then be configured to, in a step S110, update the default beam pattern so as to obtain the updated beam pattern.

Once scanning with directional beams 110a, 110b, 110c, 110d in the spatial directions has occurred as in step S112, a new beam pattern may be obtained in a new occurrence of step S102 and/or new measurement information may be obtained in a new occurrence of step S104, as indicated by the feedback steps S114, S116. New occurrences of steps S106-S112 may then be performed based on the new beam pattern and/or the new measurement information. However, as the skilled person understands, not all steps S104-S110 must be performed until the next occurrence of step S112. Which, if any, of steps S104-S110 to be performed depend inter alia on the measurement information made available to the network device 200.

In general terms, the beam pattern is determined, updated, and adjusted so as to achieve optimized network coverage for the ensemble of wireless devices served by the network device 200. Hence, the beam pattern is not necessarily determined, updated, or adjusted to optimize the network coverage for a specific wireless device or to optimize the initial access procedure of such a specific wireless device. In this respect, the operation cycle of determining, updating, and adjusting the beam pattern may be regarded as quite long compared to the mobility control cycles performed by the network device 200. In general terms, the determining, updating, and adjusting the beam pattern in the time or space domain may therefore use long-term statistics of measurements; the long-term statistics could represent statistics collected during minutes or hours, depending on the density change of wireless devices in the communications system 100 and traffic loading variation per specific deployment of the network device 200. Hence the beam pattern may be defined according to long-term statistics.

Particular reference is again made to the communications system 100 of FIG. 1.

Figure 7:
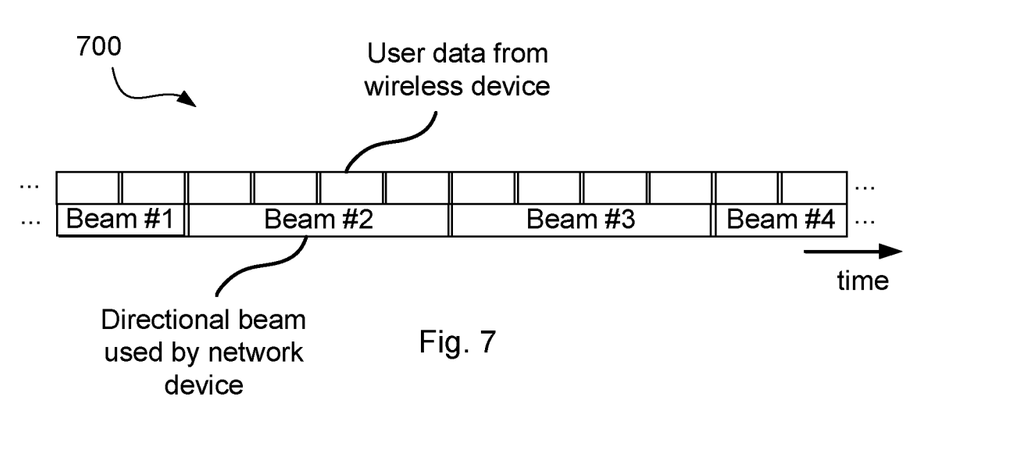
FIG. 7 schematically illustrates a beam pattern according to embodiments.

In this illustrative example, network device 200a is closest to network device 200; network device 1 is the second closest to network device 200; and network device 200d and 200c are farthest to network device 200. The service providing network coverages in different directional beams 110a, 110b, 110c, 110d are different due to the different neighboring distances: directional beam 110a takes the smallest coverage; directional beam 110b takes a larger coverage; and directional beam 110d and 110c take the similar largest coverage. The resulting beam pattern 700, as determined according to embodiments disclosed herein, for this illustrative example is illustrated in FIG. 7, in which the notation "Beam # x", where x is 1, 2, 3, or 4, represents which directional beam that is used by the network device 200 for scanning for reception of identification signals, as represented by the user data in FIG. 7, from wireless devices 120a, 120b. Hence, in relation to FIG. 1, Beam #1 may correspond to directional beam 110b, Beam #2 may correspond to directional beam 110d, Beam #3 may correspond to directional beam 110c, and Beam #4 may correspond to directional beam 110a. The duration in directional beam 110a is the shortest and the beam lobe width is largest; the duration in directional beam 110b is longer and the beam lobe width is larger; duration in directional beams 110d and 110c take the longest duration and the beam lobe width is the narrowest.

Advantageously the herein disclosed methods and network device 200 for adaptive beamforming scanning provides efficient beamforming scanning which enables efficient reception of identification signals from wireless devices.

Advantageously the herein disclosed methods and network device 200 for adaptive beamforming scanning enables regions in the network coverage having network outage to be avoided, or at least reduced.

Advantageously the herein disclosed methods and network device 200 for adaptive beamforming scanning enables bottlenecks which may occur in scenarios where identification signals are to be received by a network device, such as during random access procedures, to be resolved, or at least reduced.

Advantageously, the disclosed scanning for reception of identification signals is transparent to the wireless devices, thus avoiding additional signaling complexity between network device and wireless device, further avoiding any change in the receiving algorithm at the wireless device, and thus allowing a wide applicability.

Advantageously the herein disclosed methods and network device 200 for adaptive beamforming scanning enables a conditional (i.e., conditional on the non-uniform network coverage) unequal-time duration beam scanning procedure for reception of identification signals to match coverage demand in different directions of the network device 200. Thereby, instead of equal time-spatial beam scanning for reception of identification signals, this method for adaptive beamforming scanning enables the coverage of the directional beams to match the non-uniform directional network coverage in the different scanning directions.

Advantageously the herein disclosed methods and network device 200 for adaptive beamforming scanning could thereby be used to boost the received signal quality adaptively so as to mitigate any bottleneck caused by random access attempts made in certain regions of the network coverage of the network device 200.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method of operation at a radio access node of a communication network, the method comprising:
    determining differences in network coverage in two or more spatial directions relative to the radio network node, based on pilot-signal measurements obtained from given wireless devices operating at radio-coverage edges of the radio access node;
    configuring a beam pattern in dependence on the determined differences in network coverage, including configuring non-uniform beam durations and/or non-uniform beam shapes for two or more directional beams, wherein the non-uniformity accounts for the determined differences in network coverage; and
scanning for random-access signaling incoming from given wireless devices, according to the configured beam pattern.

2. The method of claim 1, wherein determining the differences in network coverage based on pilot-signal measurements comprises determining, for each of a plurality of directions relative to the radio access node, a quality or availability of radio coverage from one or more neighboring radio access nodes at corresponding edges of radio coverage of the radio access node.

3. A method of operation at a radio access node of a communication network, the method comprising:
determining differences in network coverage in two or more spatial directions relative to the radio network node;
configuring a beam pattern in dependence on the determined differences in network coverage, including configuring non-uniform beam durations and/or non-uniform beam shapes for two or more directional beams, wherein the non-uniformity accounts for the determined differences in network coverage; and
scanning for random-access signaling incoming from given wireless devices, according to the configured beam pattern;
wherein the radio access node uses a set of directional beams for transmission and reception, and wherein determining the differences in network coverage comprises evaluating neighbor-node radio coverage at coverage edges of the respective directional beams, based on downlink measurements made by wireless devices operating at the coverage edges of the respective beams.

4. The method of claim 3, wherein the radio access node deems respective beam directions or ranges of beam directions as corresponding to good network coverage or poor network coverage, in dependence on the evaluation of neighbor-node radio coverage, and wherein configuring the beam pattern comprises configuring beams corresponding to good network coverage to be wider or shorter in duration than beams corresponding to poor network coverage.

5. The method of claim 3, wherein the radio access node deems respective beam directions or ranges of beam directions as corresponding to good network coverage or poor network coverage, in dependence on the evaluation of neighbor-node radio coverage, and wherein configuring the beam pattern comprises using a greater number of narrower beams to span directional ranges corresponding to poor network coverage, as compared to the number of beams used to span directional ranges corresponding to good network coverage.

6. A method of operation at a radio access node of a communication network, the method comprising:
configuring a beam pattern according to differences in network coverage in two or more spatial directions relative to the radio access node, wherein the differences in network coverage relate to an extent or quality of overlapping radio coverage as between the radio access node and one or more neighboring radio access nodes, wherein the beam pattern defines a set of directional beams used by the radio access node for reception beamforming, and wherein configuring the beam pattern comprises adjusting the set of directional beams, such that a non-uniformity in beamforming gains among the directional beams reflects the differences in network coverage; and
scanning for incoming random-access signaling according to the configured beam pattern.

7. The method of claim 6, wherein adjusting the set of directional beams includes configuring non-uniform beam widths and/or beam durations within the set of directional beams, and wherein narrower beam widths provide a higher beamforming gain as compared to wider beam widths and longer beam durations provide a higher beamforming gain as compared to shorter beam durations.

8. The method of claim 7, wherein adjusting the set of directional beams comprises using wider-width or shorter-duration beams in directions having good network coverage and using narrower-width or longer-duration beams in directions not having good network coverage.

9. A radio access node configured for operation in a communication network, the radio access node comprising:
transceiver circuitry configured for reception beamforming using an associated plurality of antennas or antenna elements; and
processing circuitry operatively associated with the transceiver circuitry and configured to:
determine differences in network coverage in two or more spatial directions relative to the radio network node, based on pilot-signal measurements obtained from given wireless devices operating at radio-coverage edges of the radio access node;
configure a beam pattern in dependence on the determined differences in network coverage, including configuring non-uniform beam durations and/or non-uniform beam shapes for two or more directional beams, wherein the non-uniformity accounts for the determined differences in network coverage; and
scan, using the transceiver circuitry, for random-access signaling incoming from given wireless devices, according to the configured beam pattern.

10. The radio access node of claim 9, wherein the processing circuitry is configured to determine the differences in network coverage based on pilot-signal measurements by determining, for each of a plurality of directions relative to the radio access node, a quality or availability of radio coverage from one or more neighboring radio access nodes at corresponding edges of radio coverage of the radio access node.

11. A radio access node configured for operation in a communication network, the radio access node comprising:
transceiver circuitry configured for reception beamforming using an associated plurality of antennas or antenna elements; and
processing circuitry operatively associated with the transceiver circuitry and configured to:
determine differences in network coverage in two or more spatial directions relative to the radio network node;
configure a beam pattern in dependence on the determined differences in network coverage, including configuring non-uniform beam durations and/or non-uniform beam shapes for two or more directional beams, wherein the non-uniformity accounts for the determined differences in network coverage; and
scan, using the transceiver circuitry, for random-access signaling incoming from given wireless devices, according to the configured beam pattern;
wherein the radio access node uses a set of directional beams for transmission and reception, and wherein the processing circuitry is configured to determine the differences in network coverage by evaluating neighbor-node radio coverage at coverage edges of the respective directional beams, based on downlink measurements made by wireless devices operating at the coverage edges of the respective beams.

12. The radio access node of claim 11, wherein the processing circuitry is configured to deem respective beam directions or ranges of beam directions as corresponding to good network coverage or poor network coverage, in dependence on the evaluation of neighbor-node radio coverage, and to configure the beam pattern by configuring beams corresponding to good network coverage to be wider in shape or shorter in duration than beams corresponding to poor network coverage.

13. The radio access node of claim 11, wherein the processing circuitry is configured to deem respective beam directions or ranges of beam directions as corresponding to good network coverage or poor network coverage, in dependence on the evaluation of neighbor-node radio coverage, and to configure the beam pattern by using a greater number of narrower beams to span directional ranges corresponding to poor network coverage, as compared to the number of beams used to span directional ranges corresponding to good network coverage.

* * * * *